United States Patent [19]
Anderson

[11] 3,759,161
[45] Sept. 18, 1973

[54] DRIP-TYPE COFFEE MAKER AND THE LIKE

[75] Inventor: Gordon R. Anderson, Rockton, Ill.

[73] Assignee: Erling J. Hansen, Barrington, Ill.

[22] Filed: Mar. 1, 1972

[21] Appl. No.: 230,613

[52] U.S. Cl.................. 99/282, 99/315, 200/83 F, 219/332
[51] Int. Cl...................... A47j 31/057, H01h 35/34
[58] Field of Search...................... 99/281, 282, 283, 99/307, 315; 200/83 F; 219/332

[56] References Cited
UNITED STATES PATENTS

| | | | |
|---|---|---|---|
| 3,049,987 | 8/1962 | Bämpfer | 99/281 |
| 3,593,650 | 7/1971 | Martin et al. | 99/307 X |
| 3,369,477 | 2/1968 | Vittoe | 99/282 |

Primary Examiner—Harvey C. Hornsby
Assistant Examiner—Alan I. Cantor
Attorney—Wolfe, Hubbard, Leydig, Voit and Osann, Ltd.

[57] ABSTRACT

Water withdrawn from a supply tank is heated by an electric heater and is pumped upwardly through a distributor for discharge through a bed of ground coffee. An electric switch is responsive to the pressure of the water head in the tank and de-energizes the heater immediately upon substantially complete emptying of the tank so that no water remains in the tank to form evaporation deposits. Downwardly inclined baffles underlie the outlet of the distributor and disperse the discharged water through the coffee bed while reducing clogging of the distributor outlet due to evaporation deposits.

6 Claims, 6 Drawing Figures

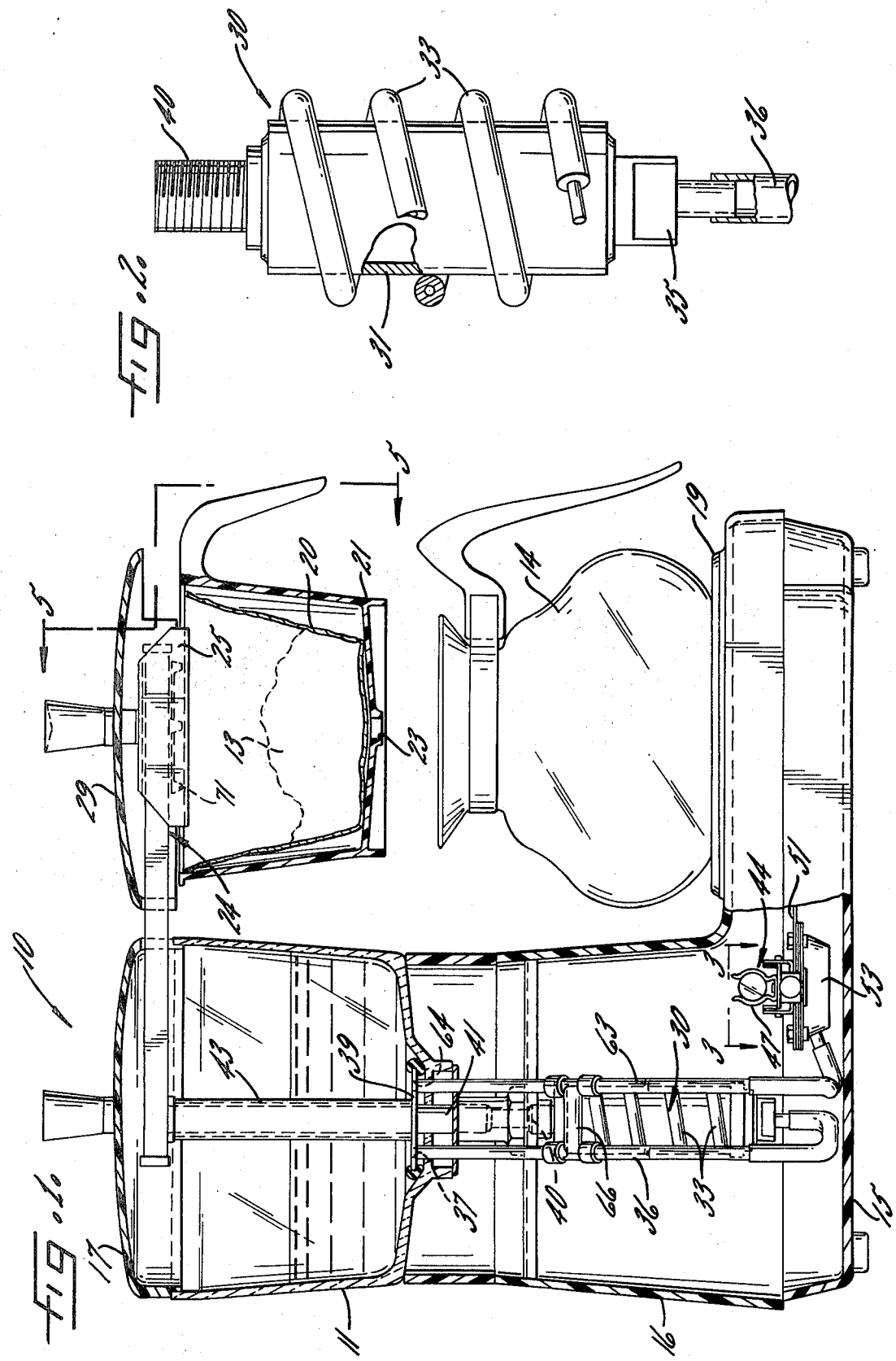

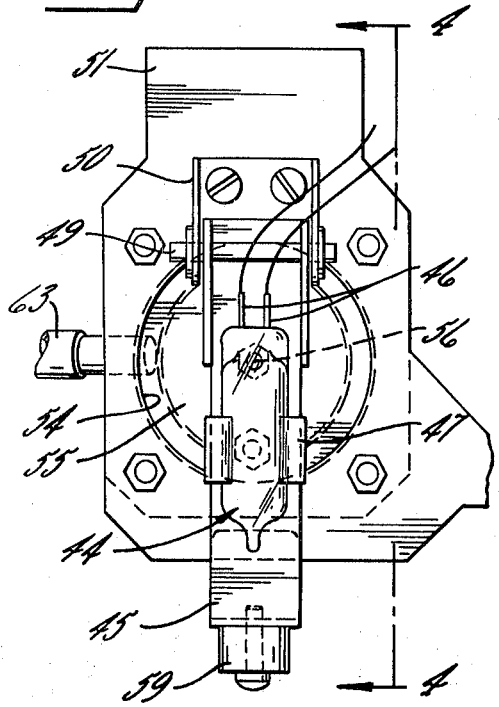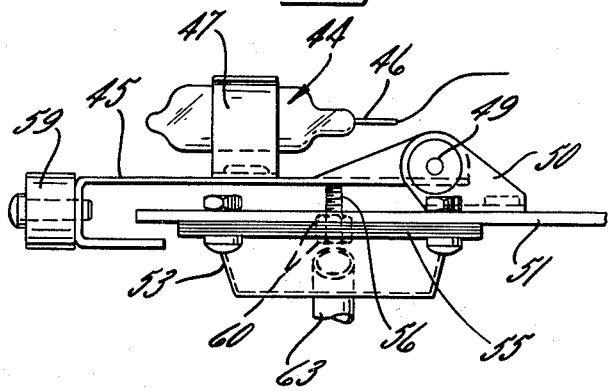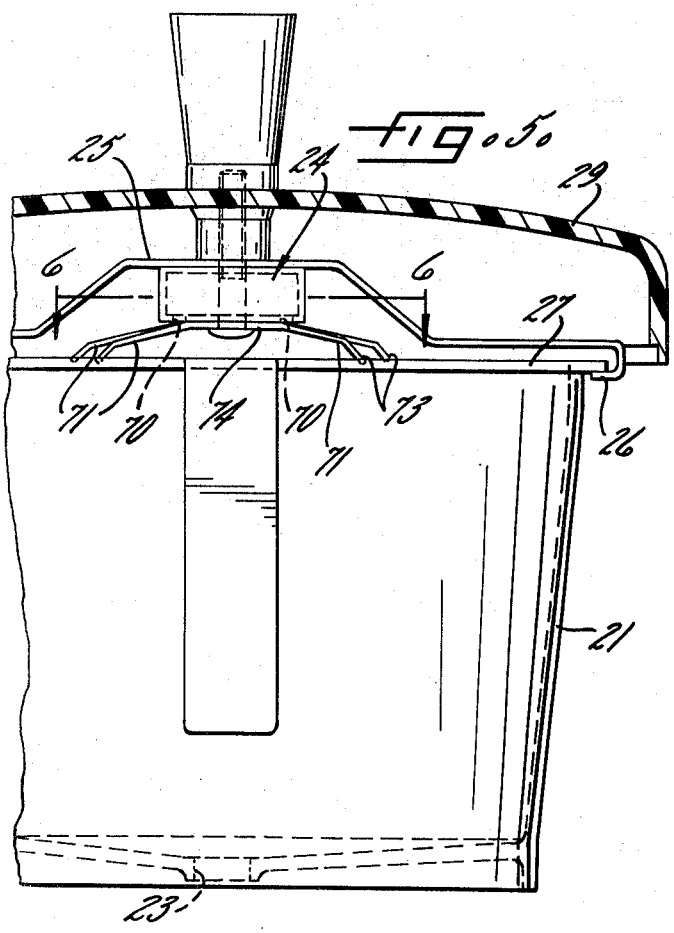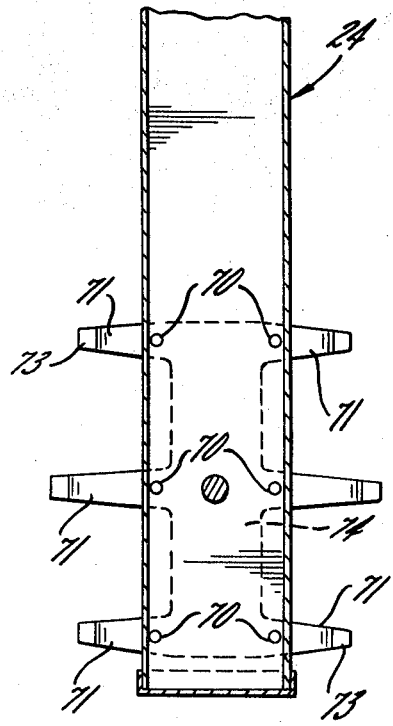

DRIP-TYPE COFFEE MAKER AND THE LIKE

BACKGROUND OF THE INVENTION

This invention relates to an appliance for heating and discharging liquid and, more particularly, to an appliance such as a coffee maker which heats water in a container and discharges the heated water through a bed of ground coffee beans or the like in order to brew fresh hot coffee. Even more specifically, the invention pertains to an appliance or coffee maker of the so-called drip type in which the water is gradually withdrawn from the container and is circulated through an electric heater operable to heat the water and to pump the water through a distributor which discharges streams of the water downwardly through the ground coffee beans in a single pass to extract their essence and flavor.

SUMMARY OF THE INVENTION

One of the general aims of the present invention is to provide a new and improved appliance of the above character which, when compared with prior appliances of the same general type, is less likely to become fouled and encrusted by sediment and deposits resulting from heating and evaporation of the water.

A further object of the invention is to achieve the foregoing and, at the same time, to effect automatic shut off of the appliance by de-energizing the heater automatically after heating of the water but only after substantially all of the water has been withdrawn from the container so as to avoid the evaporation of water in the container and to avoid fouling the container with the residue of evaporation.

Another object is to insure that the heater will be de-energized immediately after withdrawal of all of the water from the container thereby to protect the heater from being burned out or otherwise damaged.

Still another object is to provide a new and improved distributor for dispersing the heated water through the ground coffee, the distributor being characterized by its ability to remain free-flowing and unclogged by the deposits of evaporation even after extended service use.

The invention also resides in the comparatively simple and inexpensive construction of the appliance.

These and other objects and advantages of the invention will become more apparent from the following detailed description when taken in conjunction with the accompanying drawings.

BRIEF DESCRIPTION OF THE DRAWINGS

FIG. 1 is a side elevation of a new and improved appliance embodying the novel features of the present invention, part of the appliance being broken away and shown in section.

FIG. 2 is an enlarged elevational view of the heater incorporated in the appliance shown in FIG. 1, part of the heater being broken away and shown in section.

FIG. 3 is an enlarged plan view taken substantially along the line 3—3 of FIG. 1.

FIG. 4 is a fragmentary cross-section taken substantially along the line 4—4 of FIG. 3.

FIG. 5 is an enlarged fragmentary cross-section taken substantially along the line 5—5 of FIG. 1.

FIG. 6 is a fragmentary cross-section taken substantially along the line 6—6 of FIG. 5.

DETAILED DESCRIPTION OF THE PREFERRED EMBODIMENT

As shown in the drawings, the invention is embodied in an appliance 10 which has been illustrated specifically as being a coffee maker of the drip type. In such a coffee maker, water initially held in a container or tank 11 is heated to a high temperature and is distributed in downwardly flowing streams into a bed 13 of ground coffee beans. After the water trickles through the bed and extracts the essence and flavor of the ground coffee, the resulting hot liquid coffee is collected in a glass pot 14 underlying the bed.

In this instance, the coffee maker 10 includes a support or base 15 molded of relatively rigid plastic and formed at one end with a hollow pedestal 16 upon which the water tank 11 is rigidly supported. The latter also is molded of plastic and is formed with an open top adapted to be covered by a removable plastic lid 17. At the end of the base opposite the pedestal is an electrically heated warming plate 19 upon which the pot 14 rests, the plate serving to keep the coffee hot after the coffee passes through the bed 13 and trickles into the pot. The coffee bed is contained within a disposable paper filter 20 which lines the inside of a large plastic cup 21 located above the pot and formed with a downwardly opening outlet spout 23 alined with the pot. In order to support the cup 21, a water distributor 24 extends horizontally from the upper edge of the tank 11 and overhangs the pot. A plate 25 (FIG. 5) is anchored to the outer or overhanging end portion of the distributor and is formed at its side edges with a pair of downwardly inturned lips 26 which slidably receive a flange 27 projecting outwardly from and surrounding the lip of the cup. Thus, the cup may be slid outwardly and detached easily from the plate 25 when it is desired to empty the spent grounds and re-fill the cup. When attached to the plate 25, the upper end of the cup is covered by a plastic lid 29 anchored to the upper side of the distributor.

To heat the water, an electrically energizable heater 30 (FIGS. 1 and 2) is housed within the pedestal 16 and is located beneath the tank 11. The heater comprises an upright tubular brass sleeve 31 (FIG. 2) around which is wound and secured a number of turns 33 of sheathed electrical resistance heating wire, such as that sold under the trademark "Calrod," adapted to be connected to a suitable domestic voltage source by way of an on-off switch (not shown). An inlet fitting 35 is soldered to the lower end of the sleeve and communicates with the bottom of the tank 11 via a vertically extending inlet conduit or tube 36 (FIG. 1) whose lower end is connected to the fitting and whose upper end leads to and communicates with an opening 37 formed in a disc 39 seated in the bottom of the tank.

When the heater 30 is energized, water in the tank 11 flows downwardly through the inlet tube 36 and into the sleeve 31 where the water is heated to a high temperature and partially boiled. The resulting vapor pressure pumps the water upwardly through the sleeve with a pulsating action and forces the water through an outlet fitting 40 (FIG. 2) at the upper end of the sleeve. Communicating with the outlet fitting is an outlet conduit or tube 41 (FIG. 1) which leads upwardly through the center of the disc 39 and extends to the top of the tank 11, the upper end of the outlet tube being connected to the inner end of the distributor 24. Thus, fresh water in the tank 11 passes downwardly from the tank and into the heater 30 through the inlet tube 36, is heated and pumped upwardly by the heater, and passes through the outlet tube 41 and into the distributor 24 which disperses the water downwardly through the coffee bed 13 and into the underlying pot 14. Advantageously, an outer tube or sleeve 43 (FIG. 1) is telescoped over and spaced radially from that portion of the outlet tube 41 disposed within the tank 11 so as to create a dead air space between the outlet tube and the water in the tank. Accordingly, the hot water passing upwardly through the outlet tube 41 is not cooled to any appreciable degree by the surrounding colder water in the tank.

In accordance with the primary aspect of the present invention, the heater 30 is de-energized and shut off automatically at the same time that the last of the water flows downwardly out of the tank 11. Accordingly, substantially no water is left in the tank to evaporate and form deposits in the tank and yet the heater is protected against burning out since the heater is de-energized immediately after the tank is emptied.

In carrying out the invention, the water pressure within the tank 11 is sensed continuously and, when the tank empties, the pressure falls to a sufficiently low predetermined value to effect opening of a pressure-responsive switch 44 (FIGS. 1, 3 and 4) connected in series with the on-off switch in the energizing circuit of the heater. With this arrangement, the heater is energized as long as the on-off switch is on and as long as water is present in the tank 11 to create a pressure head for keeping the switch 44 closed. When, however, the tank becomes empty or substantially empty with only a few drops of water remaining, the pressure-responsive switch opens automatically to de-energize the heater so that the latter is protected and yet little or no water is left in the tank to evaporate and for deposits.

More specifically, the pressure-responsive switch 44 used herein comprises a mercury-filled bulb supported on a vertically swingable lever 45 (FIGS. 3 and 4) and having a pair of contacts 46 which are bridged by the mercury as long as the lever is held in an elevated position by the water pressure in the tank 11. When the pressure falls, however, the lever is allowed to drop and the mercury thus flows away from the contacts to break the circuit. As shown in FIGS. 3 and 4, the mercury switch 44 is supported within a spring clip 47 anchored to the upper side of the lever 45. The latter is mounted for up and down swinging by a horizontal pivot pin 49 which spans a pair of upstanding ears 50 on a horizontal plate 51 supported within the pedestal 16 just beneath the heater 30.

Located beneath and connected to the plate 51 is an upwardly opening chamber in the form of a cup 53 (FIG. 4) whose upper end is alined with an opening 54 (FIG. 3) in the plate and is covered by a resiliently flexible diaphragm 55 (FIG. 4). A pin 56 is anchored to the diaphragm and projects upwardly from the latter into underlying relation with the lever 45. When water is present in the cup 53 and is under a pressure head exceeding a given value, the diaphragm 55 is flexed upwardly and forces the pin 56 against the lever 45 to swing and hold the latter upwardly and cause closing of the switch 44. When the pressure exerted on the diaphragm falls below the given value, the weight of the lever causes the lever to swing downwardly to open the switch, downward swinging of the lever being assisted by a counterweight 59 on the free end of the lever. The initial position of the pin may be changed by adjusting the pin within nuts 60 on the diaphragm thereby to enable adjustment of the time of triggering of the switch relative to the position of the diaphragm.

The pressure of the water in the tank 11 is transmitted to the cup 53 by a downwardly extending conduit or tube 63 (FIGS. 1 and 3) whose lower end is connected into one side of the cup. At its upper end, the tube 63 communicates with a hole 64 (FIG. 1) formed in the disc 39 in the bottom of the tank 11 and spaced diametrically from the hole 37. Accordingly, the switch 44 is responsive directly to the pressure of the water in the tank and stays closed as long as water remains in the tank to keep the water in the tube 63 above a given pressure head. Once substantially all of the water has been withdrawn from the tank to expose the hole 64, the pressure in the tube is insufficient to keep the diagraphm 55 flexed upwardly and thus the lever 45 swings downwardly to open the switch and de-energize the heater 30.

Importantly, communication is established between the pressure tube 63 and the inlet tube 36 by a horizontal equalizer tube 66 (FIG. 1) which is connected into the two tubes 63 and 36 at points located near the top of the heater 30. As a result of the equalizer tube 66, any air bubbles which might be trapped in the pressure tube 63 during filling of the tank 11 are drawn out of that tube by venturi action as water flows in the inlet tube 36. Thus, air bubbles in the pressure tube are eliminated to insure that the pressure transmitted to the diaphragm 55 is representative of the water level in the tank so that the switch 44 will not be triggered before the tank is empty.

According to another aspect of the invention, the water distributor 24 is constructed in a new and improved manner to spread the heated water over the coffee bed 13 and, at the same time, to reduce clogging of the outlet of the distributor by evaporation deposits. As shown in FIGS. 5 and 6, the distributor is a tube of generally rectangular cross-section and is formed at its outer end portion with two rows of discharge holes 70 extending along the side edge portions of the tube and opening out of the bottom thereof so that the water is discharged out of the distributor in a series of streams.

Downwardly and outwardly inclined baffles 71 (FIGS. 5 and 6) underlie the discharge holes 70 and serve to deflect the discharge water outwardly and downwardly toward the coffee bed 13, the baffles for the holes of each row being spaced from one another along the length of the distributor 24. Each baffle is tapered downwardly and is formed at its outer end with a generally vertical portion 73 (FIG. 5). The inner ends of the baffles are located immediately adjacent the inboard edges of the discharge holes and are formed integrally with a mounting strip 74 anchored to the bottom of the distributor between the two rows of holes. By virtue of the baffles, the water is deflected outwardly and spread throughout the coffee bed and, in addition, the tendency for the discharge holes 70 to become clogged with evaporation deposits is reduced since any droplets of water tending to remain in the holes are attracted to and drawn along the baffles rather than evaporating in the holes.

I claim:

1. In an appliance for heating liquid and for forcing the liquid upwardly, the combination of, a support, a container on said support for holding a quantity of liquid, first and second conduits leading downwardly and upwardly, respectively, from the bottom of said container, said first conduit directly connected to and communicating with said container to receive liquid therefrom, an electrically energizable tubular heater mounted on said support beneath said container and communicating at its ends with the lower ends of said conduits, said heater being operable when energized to receive and heat liquid flowing downwardly from said first conduit and to pump the heated liquid upwardly into said second conduit, a third conduit directly connected to, leading downwardly from and communicating with the bottom of said container, means responsive to the fluid pressure in said third conduit and operable to de-energize said heater when said pressure falls to a predetermined value, and a line establishing communication between said first and third conduits, said line being connected to said first conduit at a location between said heater and the bottom of said container and being connected to said third conduit at a location between the bottom of said container and said pressure-responsive means whereby any air bubbles in said third conduit are drawn out of the latter and into said first conduit through said line by the liquid flowing downwardly to said heater through said first conduit.

2. An appliance as defined in claim 1 further including a horizontally extending distributor conduit communicating at one end with the upper end of said second conduit, a series of downwardly opening discharge holes formed in the other end portion of said distributor conduit, and downwardly inclined baffles underlying at least some of said holes for deflecting the discharged liquid outwardly away from the sides of said distributor conduit.

3. An appliance as defined in claim 2 in which said distributor conduit is a tube of substantially rectangular cross-section, said holes being formed in the bottom of said tube and being arranged in two rows extending lengthwise of the tube along the opposite side edge portions thereof, said baffles being inclined downwardly and outwardly from the sides of the tube and having inner ends located adjacent the inboard sides of the holes and near the bottom of the tube.

4. In an appliance for heating liquid and for discharging the liquid in a series of downwardly flowing streams, the combination of, a support, a container on said support for holding a quantity of liquid, a conduit leading upwardly from the bottom of said container, an electrically energizable tubular heater mounted on said support beneath said container and communicating with the container and said conduit, said heater being operable when energized to receive and heat liquid flowing downwardly from said container and to pump the heated liquid upwardly into said conduit, a horizontally extending distributor tube communicating at one end with the upper end of said conduit, a series of downwardly opening discharge holes formed in the other end portion of said distributor tube, and downwardly inclined baffles underlying at least some of said holes for deflecting downwardly flowing streams of liquid outwardly away from the sides of said distributor tube.

5. An appliance as defined in claim 4 in which said distributor tube is of rectangular cross-section, said holes being formed in the bottom of the tube and being arranged in two rows extending lengthwise of the tube along the opposite side edge portions thereof, said baffles being inclined downwardly and outwardly from the sides of the tube and having inner ends located adjacent the inboard sides of the holes and near the bottom of the tube.

6. An appliance as defined in claim 5 further including a flat mounting strip anchored to the bottom of said tube, the baffles for each row of holes being spaced from one another along said tube and all being formed integrally at their inner ends with said mounting strip.

* * * * *